US011961100B2

(12) United States Patent
Løken

(10) Patent No.: US 11,961,100 B2
(45) Date of Patent: Apr. 16, 2024

(54) METHOD OF OPTIMIZING AN OFFER VALUE TO A SELECTED GROUP OF CONSUMERS

(71) Applicant: KEZZLER AS, Oslo (NO)

(72) Inventor: Magnar Løken, Oslo (NO)

(73) Assignee: KEZZLER AS, Oslo (NO)

( * ) Notice: Subject to any disclaimer, the term of this patent is extended or adjusted under 35 U.S.C. 154(b) by 0 days.

(21) Appl. No.: 17/767,565

(22) PCT Filed: Oct. 9, 2020

(86) PCT No.: PCT/NO2020/050247
§ 371 (c)(1),
(2) Date: Apr. 8, 2022

(87) PCT Pub. No.: WO2021/071363
PCT Pub. Date: Apr. 15, 2021

(65) Prior Publication Data
US 2023/0134053 A1    May 4, 2023

(30) Foreign Application Priority Data
Oct. 9, 2019   (NO) .................................. 20191203

(51) Int. Cl.
*G06Q 30/02*   (2023.01)
*G06Q 30/0202*   (2023.01)
(Continued)

(52) U.S. Cl.
CPC ..... *G06Q 30/0202* (2013.01); *G06Q 30/0205* (2013.01); *G06Q 30/0236* (2013.01)

(58) Field of Classification Search
CPC ........... G06Q 30/0202; G06Q 30/0205; G06Q 30/0236; G06Q 30/0254; G06Q 10/067;
(Continued)

(56) References Cited

U.S. PATENT DOCUMENTS 7,130,811 B1 * 10/2006 Delurgio .......... G06Q 10/06375
705/7.29
2002/0147639 A1   10/2002 Williams et al.
(Continued)

FOREIGN PATENT DOCUMENTS

| CA | 2868196 A1 * | 4/2015 | ............. G06Q 30/02 |
| KR | 2009-0091288 A * | 8/2009 | ............. G06Q 30/02 |

(Continued)

OTHER PUBLICATIONS

Closed Loop Retail Business Process for Targeted Offers (English (United Sates)), The IP.com Prior Art Database, May 23, 2007 (Year: 2007).*

(Continued)

*Primary Examiner* — Marilyn G Macasiano
(74) *Attorney, Agent, or Firm* — Birch, Stewart, Kolasch & Birch, LLP

(57) ABSTRACT

A method of optimizing an offer value to be offered to a selected group of consumers includes selecting a series of products, wherein each are serialized unique code marked; selecting a target group of consumers from a consumer database, each consumer with a registered consumer profile in the consumer database, the selecting based on a set of criteria; selecting a first subgroup of consumers from the target group of consumers; determining an initial offer value of the uniquely code marked product to be presented to the initial first subgroup of consumers; distributing (offering) the initial offer value to the selected initial first subgroup of consumers; a number of the selected initial first subgroup of consumers accepting the offer; associating the code of the uniquely code marked product to the acceptance of offer to the consumer profile of each the accepting consumer in the first subgroup of consumers; summing the number of (Continued)

accepted uniquely code marked products to a first uptake value as a function of the initial offer value; registering the initial offer value and the first uptake value in order to calculate a first initial profit value; repeating, for a number of second, third, . . . time, the following steps: selecting a second, third, . . . subgroup of consumers from the target group of consumers; determining a second (third, . . . ) offer value of the uniquely code marked product to be presented to the second, third, . . . subgroup of consumers, being different from the first offer value; distributing (offering) the second (third, . . . ) offer value to the selected second, third, . . . subgroup of consumers; a number of the selected second group of consumers accepting the second, third, . . . offer; associating the code of the uniquely code marked product to the accepted second (third, . . . ) offer value to the consumer profile of each the accepting consumer; summing the second (third, . . . ) number of accepted uniquely code marked products to a second (third, . . . ) uptake value as a function of the second (third, . . . ) offer value; registering the second (third, . . . ) offer value and the second (third, . . . ) uptake value in order to calculate a second, (third, . . . ) initial profit value; thus establishing a set of uptake values as a function of offer values, and their calculated or estimated corresponding profit values; based on these data points, establishing a relationship of profit as a function of offer value; selecting from the relationship a near-optimal offer value giving a near-optimal profit; distributing (offering) the optimal offer value to a large part of or all of the selected target group of consumers.

3 Claims, 3 Drawing Sheets

(51) Int. Cl.
*G06Q 30/0204* (2023.01)
*G06Q 30/0207* (2023.01)

(58) Field of Classification Search
CPC . G06Q 30/0246; G06Q 30/02; G06Q 30/0207
See application file for complete search history.

(56) References Cited

U.S. PATENT DOCUMENTS

| | | |
|---|---|---|
| 2002/0165760 A1 | 11/2002 | Delurgio et al. |
| 2005/0273380 A1* | 12/2005 | Schroeder .............. G06Q 10/04 |
| | | 705/7.31 |
| 2012/0253908 A1* | 10/2012 | Ouimet .................. G06Q 30/02 |
| | | 705/26.8 |
| 2017/0109767 A1 | 4/2017 | Shpanya et al. |

FOREIGN PATENT DOCUMENTS

| | | | |
|---|---|---|---|
| WO | WO 03/048901 A2 | 6/2003 | |
| WO | WO 2003/048901 A2 * | 6/2003 | ............. G06Q 10/04 |
| WO | WO 2005/010675 A2 | 2/2005 | |
| WO | WO 2013/062744 A1 * | 5/2013 | ............. G06F 17/30 |
| WO | WO 2014/197518 A1 | 12/2014 | |

OTHER PUBLICATIONS

Kwami Senam Sedzro; Alberto J. Lamadrid; Mooi Choo Chuah, Generalized Minimax: A Self-Enforcing Pricing Scheme for Load Aggregators (Englsih), IEEE Transactions on Smart Grid (vol. 9, pp. 1953-1963), May 1, 2018 (Year: 2018).*

International Search Report, issued in PCT/NO2020/050247, PCT/ISA/210, dated Dec. 9, 2020.

Search Report issued in Norwegian priority application 20191203, dated Mar. 27, 2020.

Written Opinion of the International Searching Authority, issued in PCT/NO2020/050247, PCT/ISA/237, dated Dec. 9, 2020.

* cited by examiner

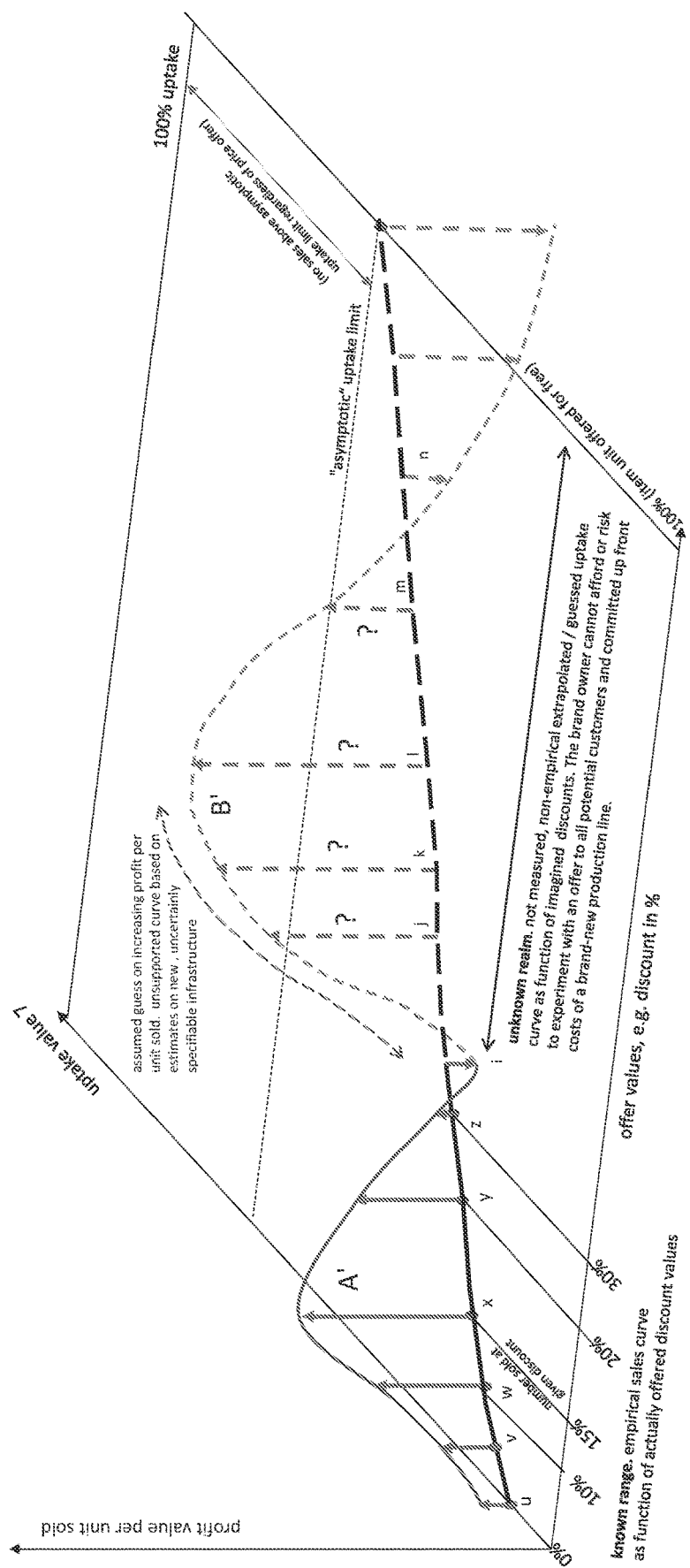
Fig. 1: Illustration of problem

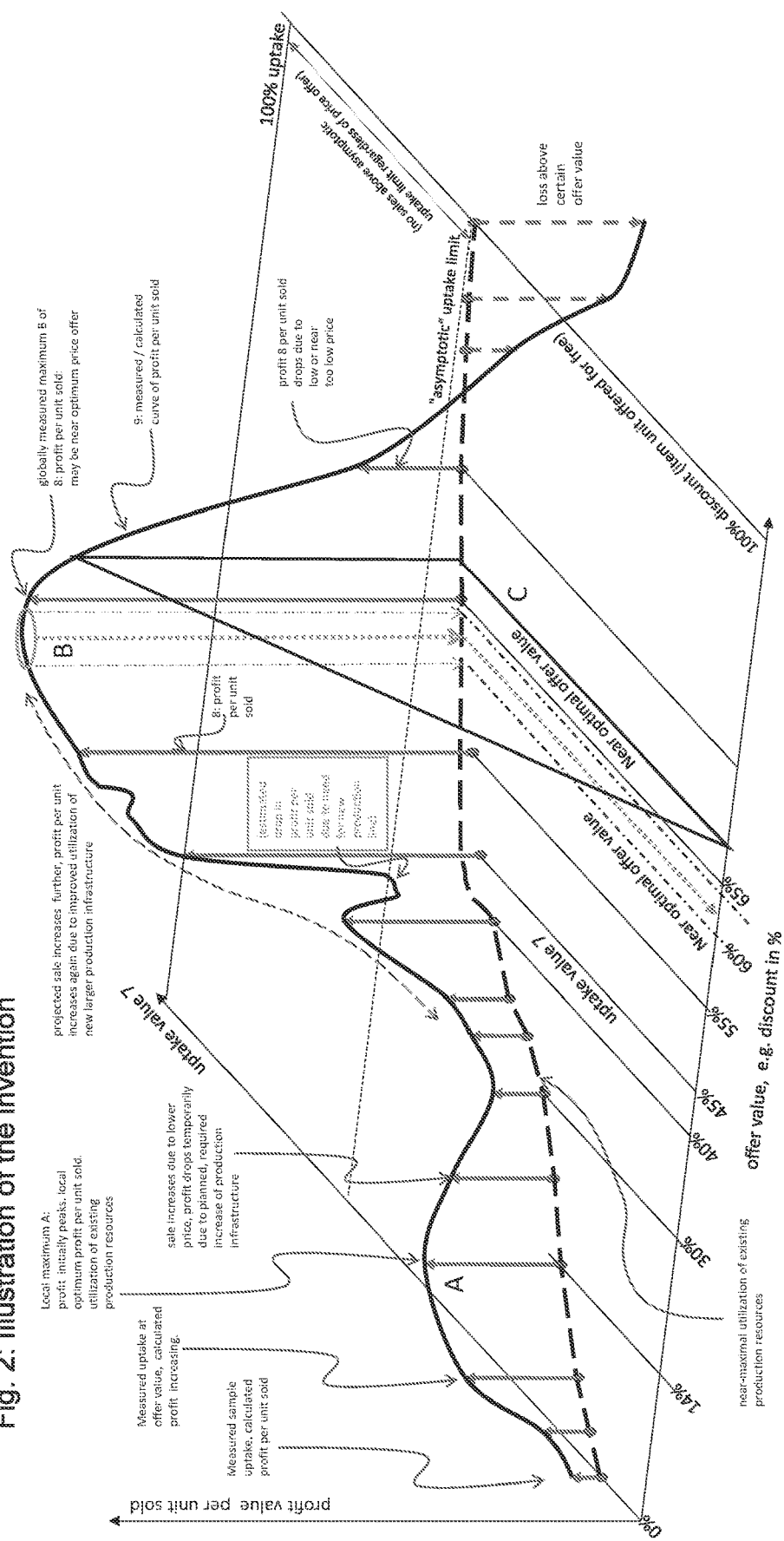

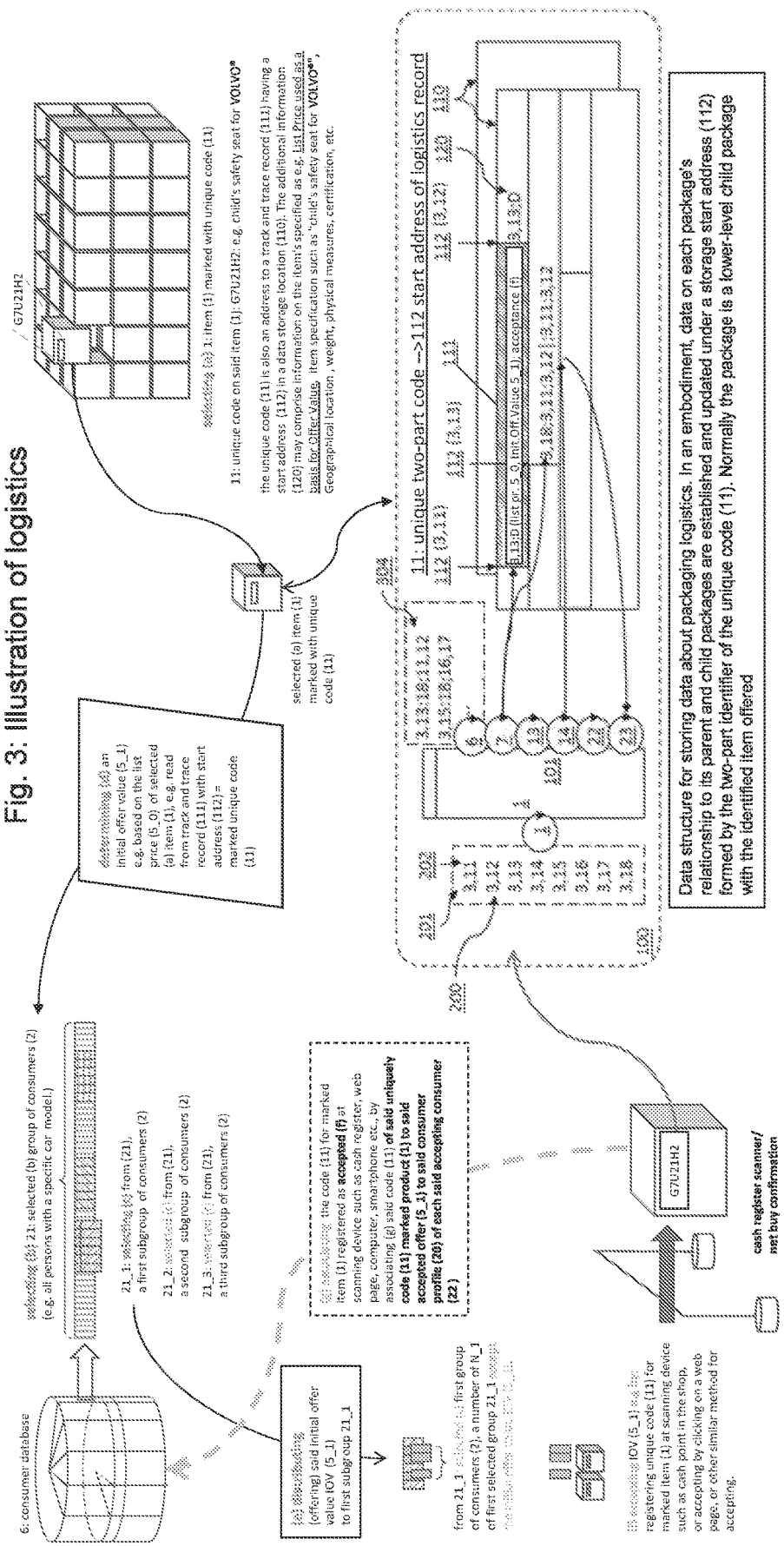

METHOD OF OPTIMIZING AN OFFER VALUE TO A SELECTED GROUP OF CONSUMERS

INTRODUCTION

The present invention relates to a method of optimizing an offer value, such as a discount, to a selected group of consumers. The optimized offer value will give a potential standard price and decision support in a new price strategy for a product, wherein the decision support may involve building new infrastructure around the product. More specifically, the method comprises selecting a series of marked products which are marked with serialized unique codes. We select a target group of consumers from a consumer database, say, 10 000 consumers satisfying some selection criteria. Statistical methods exist for selecting an appropriate number of participants in order to reach a desired level of confidence in the results. The reason for selecting the lowest possible number of "samples" is to reduce the testing cost and possible disturbance of the target group. A consumer database contains consumer profiles for each consumer registered in the database.

BACKGROUND ART AND PROBLEM RELATED THERETO

FIG. 1 illustrates offer values, e.g. discounts offered on a basic price for a given product, resulting in known sales, and estimated profit per unit sold as a function of numbers manufactured and actually sold, and indirectly the profit per unit sold may be regarded as a function of the discount on the initial price. We may assume that the product offered is a brand product which has an initially high price due to high manufacturing costs, and high startup and initial manufacturing costs due to expensive and/or inefficient existing manufacturing infrastructure. The potential number of customers for the product should be relatively large. The manufacturer and brand owner wishes to increase the number of units sold, while at the same time wishes to increase the total profit, and runs some campaigns at various outlets at 5%, 10%, 15%, 20%, and 30% discounts, using the existing manufacture infrastructure. No shop or web shop is willing to sell at more than 30% discount in the campaign. All items of the product offered at one outlet carries the same price. As is observed from FIG. 1, a small number of units are sold at no discount, see (u); some clients buy at full price, almost regardless of price, but one must assume that many potential customers would have bought if given some discount. This is proven by the increasing sales at (v) 5%, (w) 10%, (x) 15%, (y) 20%, and further. This is expected.

Another aspect of the problem to be solved may be due to geographical expansion from a known market to an unknown new market: As an example, the product is already manufactured and marketed in a known market in Germany, but the manufacturer wishes to get data for potentially expanding the manufacture and marketing in Brazil, which may potentially be a far larger market, wherein one has insufficient data for the specific product. The present invention provides a better and reasoned answer to such a request for decision data.

Basically, we do not have sufficient insight into the actual price elasticity of the consumer, particularly in some price/discount ranges, and the present invention provides a method for investigating the price elasticity of the consumers of the target group for a wide range of offer values. The price elasticity of the consumers which is unsufficiently known due to a number of factors, such as change in personal economy, change in taste, fluctuating trends, alternative replacement products, macroeconomic change, so even if we provide an instant image of the current price elasticity of the target group, this may change with time and should be re-measured at selected time intervals.

At a discount of 10% at (w), the sale is observed to increase and the profit per unit sold has an increasing sales trend. It also has an increasing gradient in the calculated profit per unit sold. This increasing profit per unit sold may be explained by to an improved utilization of existing production resources and sales volume.

The sale increases further for the discount offered at (x) 15%, (y) 20%, and further. But the profit per unit sold flattens out at the offer value of 15% at (x) at the local maximum illustrated as (A') of FIG. 1, most typically due to a present maximum economic utilization of existing production resources and infrastructure: day shift capacity fully utilized, existing machines fully utilized at day time, no need for improvement of energy supply, no need for extra storage capacity, nor increased transport costs, etc. The term infrastructure should be understood to include anything which carries a costs in production context.

However at point (A'), the production capacity is not entirely utilized; it may be increased to meet demand created by an increased demand at a discount at (y) of 20% and further increased demand at a discount at (z) of 30%. At (y) and (z), the sale increases due to lower price, profit per unit sold drops, e.g. due to requirement of evening shifts, night shifts, utilization of existing production infrastructure near or beyond its intended capacity incurring costly repair, etc. It is seen that the known or roughly estimated relationship between profit per unit sold decreases after the (probably) local optimum at (A'). It is assumed that an actual loss per sold unit occurs at an offer value of, say, 32%, as roughly illustrated in FIG. 1.

Further, in FIG. 1, it shows hypothetical discounts ranging between the so far un-economical values of 32% and the unthinkable discount of 100%, i.e., giveaway status of otherwise valuable goods. It is assumed that sales increase may increase profit per unit sold, due to improved utilization, but in the lower end of this unknown realm wherein new larger production infrastructure and training of new personnel is required, the profit per unit sold is still negative, but would improve at (j) and (k) probably requiring discounts of about 50% of the initial list price, which probably no shop owner would be willing to give at the time of having only the original sales volume and the original manufacture capacity data. There are at (k) and (l) no known sales data on any of these discounts, thus no measurements; maximum profit per unit sold is entirely unknown, an optimum price offer is unknown, and it would be very difficult or risky to increase the production capacity and strengthen the sales efforts if no data are reliably projected. It is, however certain that assumed profit per unit sold drops at some unknown discount value between (l) and (m) due to lower price, but probably still profitable as a whole because of a lower price and not loss. It is further not known at which price discount between points (m) and (n) of the highly imagined offer values will incur loss for each new sold item. Making a decision based on such a lack of crucial cost and price elasticity information may incur serious impacts on profitablity.

Approach to a Solution

There is a need for the manufacturer and brand owner to measure the uptake as a function of offer values, and with these measurements rather precisely estimate and predict the probable profit values per unit sold for a wide range of offer values beyond existing "locked" sales which do not allow for variation when first offered at a location, and to estimate an optimal offer value for a product which would optimize the profit per unit sold, further in order to maximize profit. This would be a win/win situation as it would also serve the potential buyers which would then obtain significantly cheaper products if production and sales was increased so as for allowing a reduced price for all instead of a less reduced price to some. Essentially the invention provides a method of whether an economic of scale actually does exist for a specific product in a given market.

One problem for the manufacturer or brand owner is how to optimize an offer value for the selected product so as for optimizing the production. It is no good solution to guess at an optimal offer value and then build infrastructure which would meet an unknown demand with no tangible feedback from the target group. It shows out that there is an interconnection between the offer values, the resulting consumers uptake values, i.e. the uptake value being the proportion of product actually sold at a given offer value, and the profit value per unit sold, which further may be integrated to the profit value for the product. This connection is outlined by the curve (9) in FIG. 2.

A consumer profile may comprise consumer identification data and consumer history, and consumer preferences, among other information. Initially we set up criteria for selecting a target group of consumers for a product which we believe would be relevant to that selected target group. An example would be a target group of having a particular car brand and model, and a child safety seat which will fit in that particular car model. We select a series of different subgroups of consumers, say 16 consumers in each subgroup, and eight subgroups from the target group of 10 000 consumers. The consumers in each subgroup are then given the same initial offer value, e.g. a discount value, of the uniquely code marked products, and each subgroup are given different initial offer values or discounts on the uniquely code marked products. An offer value may be a discount, but it may also be a perceived increased value associated with the product, such as extended service level, experience, guarantee time, VIP status, associated products, additional spare parts, etc.

We then register the response to the different initial offer values, we kind of "sample" point responses from the potential target group. We register the corresponding different uptake values as a function of the offer value given to each test subgroup, and we calculate or estimate corresponding profit values. The uptake values and their corresponding profit values are used to establish a relationship of profit as a function of the initial offer values. This resulting profit function is used for selecting an near-optimal offer value which may provide an optimal profit per unit sold based on the relationship, in order to offer this near-optimal offer value as a discount offered to a large part of the selected target group of consumers, or to all of the remaining of the selected target group.

BRIEF FIGURE CAPTIONS

FIG. 1 is an illustration of the problem related to different empirical discount sales resulting in an increasing sale as such, but with little or no knowledge rendered about how larger discounts and increased sales volume could have developed.

FIG. 2 is an illustration of the invention, comprising "sampling" the willingness of potential customers to buy a specific product at a specific offer value, and an estimation of the profit per unit sold of already sold items during a test sale; in other words the test uptake as a function of offer value in the "horizontal plane", and further, estimated profit values per unit sold as a function of the measured test uptake, in the vertical plane.

FIG. 3 (over two pages) is an illustration of embodiments of the invention which is a method of optimizing an offer value to a selected group of consumers. The purpose is to optimize profit per unit sold, and eventually the optimal total profit due to highest possible number of units sold.

DESCRIPTION OF EMBODIMENTS OF THE INVENTION

FIG. 2 is an illustration of the invention, test uptake as a function of offer value in the "horizontal plane", and further, estimated profit values per unit sold as a function of the measured test uptake along the vertical direction. We may now have measurements for the entire range of 0 to 100% of offer values, which provides a far wider data set for making a decision than the empirically obtainable data as illustrated in FIG. 1.

The profit values, at least for existing, relatively low volume production capacity, i.e. infrastructure, may at an early stage be calculated, because we may in a situation of limited production capacity which may only allow producing a limited number of items corresponding to the first, lower bulge (A') of FIG. 1, wherein the existing production capacity is more or less fully utilized, and we may only guess on profit values per unit sold for larger production corresponding to unknown sales according to a possible second, higher bulge (B') due to the lack of knowledge described above. However, a higher offer value range bulge (B) of FIG. 2 may be calculated from the test data retrieved from registered sales as response to the test offer values of the invention; precise data will allow a good and quite reliable estimate for increasing the infrastructure to fit the optimum profit value.

According to the invention, the initial test offer values or discounts presented to the potential group of buyers in each subgroup of the target group may range from 0% (full price or "list price") to near 100% discount ('giveaway') on the list price. The offer may be made to randomly selected individuals of the subgroups selected, and offered via the internet or by mail or any suitable communication means and methods, and the uptake may be measured directly in the net shop or registration of the sale in other electronic ways such as at a cash point or other indication for registering acceptance of the price offer, and registered immediately in the consumer profile (20) in the database (6) for each accepting consumer (22). The measured uptake is illustrated in FIG. 2 as increasing from a low value (clients who buy at 0% offer value regardless) and up to a high value (here at about 65% uptake) for very high offer values. As may often be commonly experienced in sales, a large proportion of the potential consumers will never buy a particular product regardless of how cheaply the product is offered, they either do not actually need or want our product, or they already have a corresponding product or alternative, competing product.

Further, FIG. 2 illustrates, in the "vertical" direction, the third axis extending above the offer value—uptake horizontal plane, the profit per unit sold as a linked but indirect function of the offer value, with the base of the curve traced along the measured uptake values (here interpolated to a curve).

Initially, in FIG. 2 the profit per unit sold increases with increasing offer values due to improved utilization of production and marketing resources, and peaks near bulge "A", here at about 14% offer value, due to near-optimal utilization of existing production infrastructure; one have not to invest in new production facilities or new employments, nor evening or night shifts in the existing production lines. It is possible to estimate rather precisely the profit per unit sold up and around this first peak because it contains already rather accurately known costs around the existing production infrastructure and marketing facilities.

An advantage of the present invention is that the test offer values made to small subgroups of a large target group and varying the offer values to the small "sample" subgroups far beyond offer values available within the "unexpanded" present production, is that a precise image of possible profit values per unit sold may be calculated also for a hughely expanded manufacturing infrastructure capacity at far higher offer values than the presently available, because one may plan the increased production size rather more accurately than basing the expansion only on extrapolating data from historical sales only, which must be considered highly unreliable. The same price elasticity experiment to obtain significant data on an optimal offer value and optionally calculating the required related infrastructure expansion would hardly be feasible for a full scale sale. The loss represented by the above-loss limit of FIG. 2 during the test is of insignificant or very low cost compared to the potential profit from the precisely planned increased production infrastructure capacity and expected sales. The present illustration of making offer values to e.g. 16 persons of about 16 subgroups represent only about 1.5% of a total target group of 10 000 persons, which is in itself rather small in a large market.

Having sampled the response from the test subgroups, one will have data according to FIG. 2. If the offer value is increased above the illustrated example of approximately 14%, the uptake may increase, but the estimated profit per unit sold drops due to requirement of more expensive evening or night shifts, of building upgraded or new production infrastructure, employing and training new employees, increasing marketing costs, increasing transport costs, etc. A low in the profit per unit sold as illustrated here is reached at an offer value of about 31%.

In the illustrated, imagined example curve, according to the invention, from offer values such as price discount offers made in the range between 32% to 62% offer value, the estimated profit per unit sold is calculated to increase again due to increasingly improved utilization of new production machines and infrastructure, increasing discounts from suppliers and subcontractors due to increased volumes, etc., and it is assumed that there is an estimated peak profit per unit sold at around 60-62% offer value, indicated as near the top portion of the higher bulge "B" of the profit curve. From then on, above this peak of bulge "B", the profit per unit sold decreases due to increasingly low price, and will eventually drop to a loss per unit sold, for too low prices, offer values above about 82% offer value, regardless of how efficient production, marketing and distribution is achieved. However, total profit will be achieved up to just below the limit of 82% offer value in this example.

The estimated total profit for the offer value at "c" in FIG. 2 is proportional to the area of triangle "C": the profit per unit sold multiplied by the uptake value, adjusted for the number of persons in the target group.

The problem is how to find such an near-optimal offer value which results in such near-maximum profit per unit sold. The present invention is a method and system for finding such a near-optimal offer value to maximise total profits.

We may imagine the product to be offered is a high-quality child safety seat "MilliGauss" for a car brand, "Gauss". The potential target group is the imagined Gauss car owners which may be in a number of about one million. According to an embodiment of the invention each of the manufactured items, e.g. the safety child seats, may be certified according to a safety and manufacturing/material standard. According to the invention each manufactured unit, e.g. each child safety seat, is marked, carrying a unique identifier in order to prevent counterfeiting. Each unique identifier may according to the invention comprise a batch number and a production serial number within each batch, a so-called two-part identifier. Each unique identifier is in an embodiment of the invention encrypted so as for further preventing counterfeiting. Only a limited number of persons or machines will know how to decrypt the unique serialized codes from the marking on the item.

According to the invention, a procedure and system is provided so as for optimizing the profit for selling such uniquely marked child safety seats.

The invention is illustrated in FIGS. 2 and 3 and is a method of optimizing an offer value to a selected group of consumers. The purpose is to optimize profit unit sold and thus total profit. According to the invention, we conduct the following steps:

we select (a) a series of products (1) wherein each are serialized unique code (11) marked. For example the products (1) may be safety child seats.

further, we select (b) a target group (21) of consumers (2) from a consumer database (6). Each consumer (2) has a registered consumer profile (20) in said consumer database (6), and said selecting action (b) is based on a set of criteria (4). The target group (21) may be registered consumers (2) being owners or users of the particular car model. The set of criteria (4) may comprise age, civil status, the consumer (2) being parent or not parent, income within a given range, education level and/or professional position, home address, etc., purchase date of the particular car, number of cars, etc.

then we select (c) a first subgroup of consumers $(21_{-1})$ from said target group of consumers (21); This selection (c) may be random as the target group of consumer criteria (4) is already fulfilled.

Further, we determine (d) an initial offer value $(5_{-1})$ of said uniquely code (11) marked product (1) to be presented to the individuals of said initial first subgroup of consumers $(21_{-1})$; This determination (d) needs not bee too advanced, we may say "let us start with 5% discount for the first ones". The offer value ($5\_1$) may be a price, a discount, a rebate, a cash discount, etc. ranging from (0%-100%)

After determining (d) the offer value, we distribute or offer (e) the initial offer value $(5_{-1})$ to the selected initial first subgroup of consumers $(21_{-1})$, in other words, we give the discount offer to each member of the initial first subgroup. This distributing or offering action may be via e-mail, sms, ordinary mail, "social" media web address, telephone call, or whatever communicating means believed to function.

(f) we receive an acceptance (f) response from a number of $(N_{-1})$ of said selected initial first subgroup of consumers $(21_{-1})$ accepting said offer $(5_{-1})$, i.e. those who accept, please see FIGS. 2 and 3. We then associate (g) said code (11) of said uniquely code (11)

marked product (1) to said accepted offer (5_1) to said consumer profile (20) of each said accepting consumer (22). In other words, we associate or allocate, for each of the number of ($N_{-1}$) the corresponding unique code (11) of the marked products (1) which those people who actually buy or order.

(h) Then a summation (h) is made of said number ($N_{-1}$) of accepted uniquely code (11) marked products (1) to constitute a first uptake value ($7_{-1}$) as a function of said initial offer value ($5_{-1}$);

(i) register said initial offer value ($5_{-1}$) and said first uptake value ($7_{-1}$) in order to calculate a first initial profit value ($8_{-1}$) per unit sold;

repeating similar steps, for a number of second, third, fourth, etc. . . . times, the following steps:

(c) select a second, (third, . . . ) group of consumers ($21_{-2}$, $21_{-3}$, . . . ) from said target group of consumers (2);

(d) determine a second (third, . . . ) offer value ($5_{-2}$, $5_{-3}$, . . . ) of said uniquely code (11) marked product (1) to be presented to said second, group of consumers ($21_{-2}$, $21_{-3}$, . . . ); being different from said first offer value ($5_{-1}$);

(e) distributing (offering) said second (third, . . . ) offer value ($5_{-2}$, $5_{-3}$, . . . ) to said selected second (third, . . . ) subgroup of consumers ($21_{-2}$, $21_{-3}$, . . . );

a number of ($N_{-2}$, $N_{-3}$ . . . ) of said selected second group of consumers ($21_{-2}$, $21_{-3}$, . . . ) accept (f) said second (third, . . . ) offer value ($5_{-2}$, $5_{-3}$, . . . );

associating (g) said code (11) of said uniquely code (11) marked product (1) to said accepted second, (third, . . . ) offer value ($5_{-2}$, $5_{-3}$, . . . ) to said consumer profile (20) of each said accepting consumer (22), summing (h) said number (N) of accepted uniquely code (11) marked products (1) to a second (third, . . . ) uptake value ($7_{-2}$, $7_{-3}$) as a function of said second offer value ($5\_2$);

registering (i) said second (third, . . . ) offer value ($5_{-2}$, $5_{-3}$, . . . ) and said second (third, . . . ) uptake value ($7_{-2}$, $7_{-3}$) in order to calculate a second, (third, . . . ) initial profit value ($8_{-2}$, $8_{-3}$) per unit sold.

thus having established a set of uptake values (7) as a function of offer values (5), and their corresponding profit values (8) per unit sold;

based on these data points, establishing a relationship (9) of profit (8) as a function of offer value (5); such as interpolating between the data points. For interpolating, we may use some kind of Spline function or the like.

selecting from said relationship (9) an optimal offer value ($5_{-0}$) giving an optimal profit ($8_{-0}$) per unit sold;

distributing (offering) said optimal offer value ($5_{-0}$) to part or all of said selected target group (21) of consumers (2).

The invention claimed is:

1. A method of optimizing an offer value to be offered to a selected group of consumers so as to materially increase a manufacturing infrastructure around a product according to the optimized offer value, comprising the steps of:

selecting (a) a series of products, wherein each of the series of products are serialized unique code marked, the series of products being of the same type;

selecting (b) a target group of consumers from a consumer database, each consumer with a registered consumer profile in said consumer database, said selecting based on a set of criteria;

selecting (c) a first subgroup of consumers from said target group of consumers;

determining (d) an initial offer value of said uniquely code marked product to be presented to said initial first subgroup of consumers;

distributing (offering) (e) said initial offer value to said selected initial first subgroup of consumers;

a number of said selected initial first subgroup of consumers accepting (f) said offer;

associating (g) said code of said uniquely code marked product to said acceptance (f) of offer to said consumer profile of each said accepting consumer in said first subgroup of consumers;

summing (h) said number of accepted uniquely code marked products to a first uptake value as a function of said initial offer value;

registering (i) said initial offer value and said first uptake value in order to calculate a first initial profit value;

repeating, for a number of second, third, . . . time, the following steps:

selecting (c) a second, third, . . . subgroup of consumers from said target group of consumers;

determining (d) a second (third, . . . ) offer value of said uniquely code marked product to be presented to said second, third, . . . subgroup of consumers, the second (third, . . . ) offer value being different from said first offer value;

distributing (offering) (e) said second (third, . . . ) offer value to said selected second, third, . . . subgroup of consumers;

a number of said selected second group of consumers accepting (f) said second, third, . . . offer;

associating (g) said code of said uniquely code marked product to said accepted second (third, . . . ) offer value to said consumer profile of each said accepting consumer;

summing (h) said second (third, . . . ) number of accepted uniquely code marked products to a second (third, . . . ) uptake value as a function of said second (third, . . . ) offer value; and registering (i) said second (third, . . . ) offer value and said second (third, . . . ) uptake value in order to calculate a second, (third, . . . ) initial profit value;

thus establishing a set of uptake values as a function of offer values and their calculated or estimated corresponding profit value;

based on these data points, establishing a relationship of profit as a function of offer value;

selecting from said relationship a near-optimal offer value giving a near-optimal profit; and distributing said optimal offer value to a large part of or all of said selected target group of consumers.

2. The method of claim 1, said set of criteria for said target group of consumers comprising one or more of the following parameters:

upper and lower consumer age limits;
consumer economical status information;
consumer property limits;
consumer civil status;
consumer gender;
consumer educational level;
consumer consumption history;
consumer brand preference;
consumer size preference;
consumer purchase behaviour;
previous sales of same product or similar products; and
consumer vehicle information.

3. The method of claim 1, further comprising the step of optimizing the manufacturing infrastructure to a predicted optimized production volume for the product according to the optimized offer value.

* * * * *